H. R. HASKELL.
ANIMAL FEED BAG.
APPLICATION FILED JULY 8, 1911.

1,049,231.

Patented Dec. 31, 1912.

Witnesses
H. A. Stock
E. E. Vrooman

Inventor
HERBERT R. HASKELL.
By Harry C. Schroeder
Attorney

UNITED STATES PATENT OFFICE.

HERBERT R. HASKELL, OF OAKLAND, CALIFORNIA.

ANIMAL FEED-BAG.

1,049,231.  Specification of Letters Patent.  Patented Dec. 31, 1912.

Application filed July 8, 1911. Serial No. 637,478.

*To all whom it may concern:*

Be it known that I, HERBERT R. HASKELL, a citizen of the United States, residing at Oakland, in the county of Alameda and State of California, have invented certain new and useful Improvements in Animal Feed-Bags, of which the following is a specification.

This invention relates to feed bags adapted to be suspended from a horse's head and has for its object to provide an improved feed bag of this kind which is so constructed that it will enable a horse to reach all the feed in the bag without tossing its head.

The invention further has for its object to provide an improved feed bag for horses, which not only enables a horse to reach all the grain without tossing its head and thereby wasting the feed but which will collect the feed while it is being eaten within reach of the horse's mouth.

The invention further has for its object to provide an improved feed bag for horses which will be simple in construction and well ventilated and adapted to permit of free movement of the horse's head in the bag while eating.

Figure 1:
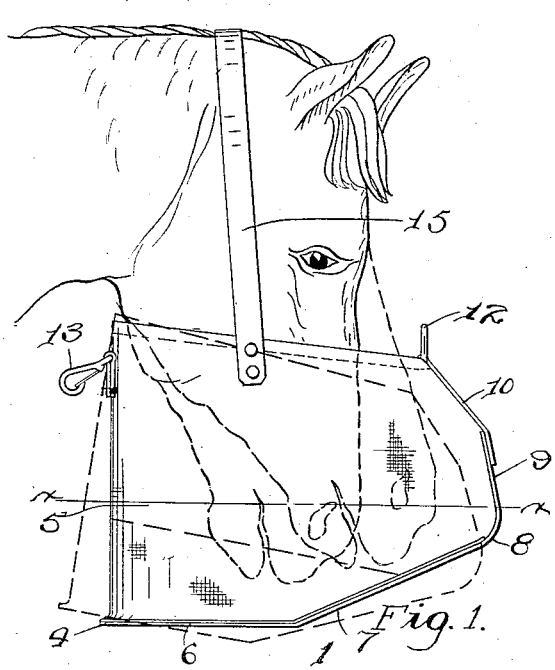
Figure 2:
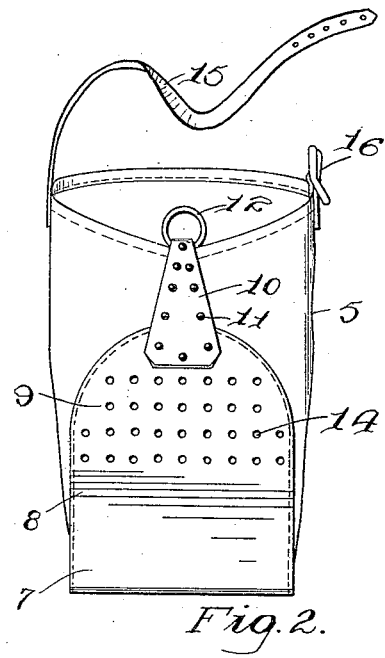
Figure 3:
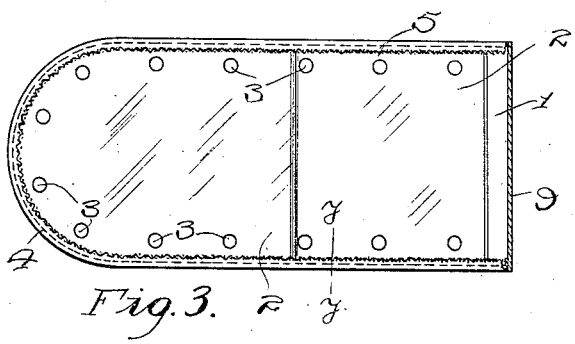
Figure 4:
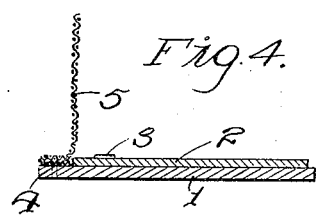
Figure 5:
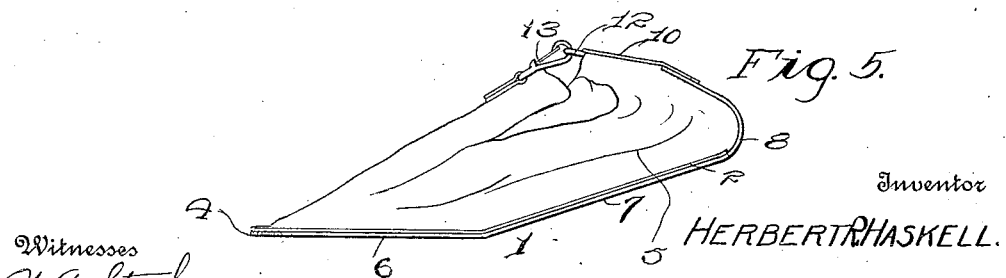

Referring to the accompanying drawings: Figure 1 is a view of a feed bag constructed in accordance with this invention and shown as suspended from a horse's head. Fig. 2 is a front view of the feed bag. Fig. 3 is a plan view in horizontal section on the line X—X, Fig. 1. Fig. 4 is an enlarged detail view of a portion of the bottom and one side of the bag in cross section on the line Y—Y, Fig. 3. Fig. 5 is a side view of the bag in folded position.

The feed bag constructed in accordance with this invention consists of a bottom 1, preferably of leather, and of an oblong shape and sheathed on its inner side with a covering 2, preferably of sheet metal, secured to the bottom 1 by rivets 3 or in any other suitable manner. The metal 2 does not extend quite to the edge of the leather bottom 1 thereby forming a flange or extension 4 to which is secured by stitching or other suitable means the sides 5 of the bag formed of canvas or other suitable material and having its meeting edges located in the front of the bag. The bottom 1 of the bag is formed with the horizontal portion 6 extending from the back of the bag to a point adjacent to the central vertical portion of the bag and then formed with the upwardly inclined portion 7 with the curved portion 8 at its outer end and an upwardly and inwardly inclined portion 9 extending from the curved portion 8. The front portion of the canvas body of the bag is cut away and secured in any suitable manner to the inclined portion 9 of the bottom and the upper meeting edges of the front portion of the bag are secured together by the strip 10 of leather or other suitable material secured thereto and to the upper end of the inclined portion 9 by rivets 11 or in any other suitable manner. The bag so constructed and arranged is adapted to be folded up in collapsible position as shown in Fig. 5 and when so folded is fastened in folded position by means of a ring 12 on the upper end of a strip 10 which engages a snap hook 13 on the upper edge of the rear portion of the bag. The inclined portion 9 is provided with ventilating holes 14 which provide ample ventilation for the bag when in use for feeding. The bag is suspended from the horse's head by the usual form of head strap 15 secured at one end to the top to the bag and detachably connected with a buckle 16 on the opposite side of the bag.

It will be seen that by means of the oblong construction of the bag that a horse using the bag may freely move his head backward and forward so as to readily reach the feed in the rear portion of the bag and that when the horse raises his head to feed, his mouth will be brought over the bottom of the bag at the forward end thereof and the feed dropping from his mouth and falling on the inclined portion 7 will slide back to the horizontal portion 6 thereby enabling the horse to readily reach the feed without tossing the bag.

The arrangement of the perforated holes 14 in the front of the bag with the oblong shape of the bag provides ample ventilation for a horse as he moves his nose to the front end of the bag. While the horse is chewing the feed with his head raised for that purpose his nose will project into the front extended portion of the bag and when his head is lowered to reach more feed in the bottom of the bag at its rear end the bag swings forward bringing the feed within reach of its mouth, thereby avoiding the necessity of tossing the bag with its head. The metal sheathing 2 in the bottom of the bag serves both to hold the bottom in shape and provides a smooth and clean surface for the feed which slides back to the horizontal portion of the bag. When the bag is not in use it may be folded up to the position shown in Fig. 5 by pulling the front of the bag and the back thereof together and securing it in folded position by the ring 12 and snap hook 13.

What I claim is:—

A feed bag for horses consisting of a bottom formed with a horizontal portion, an upwardly inclined portion, an elevated portion at the outer end of said inclined portion, a metal lining extending from the rear of the bottom to a point adjacent the elevated portion at the front end whereby said elevated portion may be bent back over the bottom, a body portion of flexible material secured to said bottom, and a reinforcing strip secured to the front of the body portion and to said elevated portion of the bag, and means for suspending said bag from a horse's head.

In testimony whereof I affix my signature in presence of two witnesses.

HERBERT R. HASKELL.

Witnesses:
   H. C. SCHROEDER,
   F. P. SCHROEDER.

---

Copies of this patent may be obtained for five cents each, by addressing the "Commissioner of Patents, Washington, D. C."